(12) United States Patent
Isager

(10) Patent No.: US 10,726,091 B2
(45) Date of Patent: Jul. 28, 2020

(54) DYNAMIC CONTENT MODIFICATIONS

(71) Applicant: Siteimprove A/S, Copenhagen (DK)

(72) Inventor: Kasper Kronborg Isager, Copenhagen (DK)

(73) Assignee: Siteimprove A/S, Copenhagen (DK)

( * ) Notice: Subject to any disclaimer, the term of this patent is extended or adjusted under 35 U.S.C. 154(b) by 0 days.

(21) Appl. No.: 16/404,166

(22) Filed: May 6, 2019

(65) Prior Publication Data
US 2019/0340212 A1 Nov. 7, 2019

Related U.S. Application Data

(60) Provisional application No. 62/666,950, filed on May 4, 2018.

(51) Int. Cl.
*G06F 13/00* (2006.01)
*G06F 16/955* (2019.01)
*G06F 16/958* (2019.01)
*G06F 16/957* (2019.01)

(52) U.S. Cl.
CPC ........ *G06F 16/9566* (2019.01); *G06F 16/957* (2019.01); *G06F 16/972* (2019.01)

(58) Field of Classification Search
CPC .... G06F 16/9577; G06F 16/957; G06F 40/14; G06F 16/958; G06F 40/00; G06F 40/226; G06F 40/106; G06F 8/65; G06F 16/972; G06F 40/154; G06F 16/9566; G06F 8/38; G06F 8/34
USPC ......... 709/223, 203; 715/809, 736, 772, 859
See application file for complete search history.

(56) References Cited

U.S. PATENT DOCUMENTS

| | | | | |
|---|---|---|---|---|
| 8,332,763 | B2* | 12/2012 | Zhang | G06F 16/972 715/760 |
| 9,641,590 | B2* | 5/2017 | Kuscher | G06F 8/65 |
| 10,534,830 | B2* | 1/2020 | Fanning | G06F 16/957 |
| 2010/0313149 | A1* | 12/2010 | Zhang | G06F 16/972 715/760 |
| 2012/0331375 | A1* | 12/2012 | Fanning | G06F 16/986 715/234 |
| 2016/0063131 | A1* | 3/2016 | Kuscher | G06F 16/957 715/234 |
| 2020/0073921 | A1* | 3/2020 | Bradley | G06F 40/134 |

* cited by examiner

*Primary Examiner* — Kenneth R Coulter
(74) *Attorney, Agent, or Firm* — Fish & Richardson P.C.

(57) ABSTRACT

In some implementations, a method for remediating issues on webpages through client-side fixes that are performed without modifying underlying webpage code includes receiving, at a remediation server system, a request for remediation code, the request for remediation code originating from a client computing device that has accessed a webpage that has a statement requiring the remediation code, the webpage being part of a website that is hosted by a third party server system, the request identifying the webpage that is requesting the remediation code. The method can further include identifying one or more specific remediations for remediating issues on the website; accessing one or more specific remediation code portions; and accessing a client-side remediation code engine. The method can further include transmitting the client-side remediation code engine and the one or more specific remediation code portions to the client computing device.

6 Claims, 8 Drawing Sheets

DYNAMIC CONTENT MODIFICATIONS

CLAIM OF PRIORITY

This application claims priority to U.S. Provisional Application Ser. No. 62/666,950, filed on May 4, 2018, the entire contents of which are hereby incorporated by reference.

BACKGROUND

Websites can vary in their quality. The quality of a website can affect the experience of users visiting the website and can also affect how/when the website is returned in search results by search engines. In some cases, the quality of a website can be characterized or measured by the accessibility of the website to users with disabilities or special needs. For example, a user with a hearing disability cannot fully use a website if one or more pages of the website have accessibility issues related to hearing or sound.

Website quality can also affect how and when search engines return websites in search results. For example, a website that contains broken links—meaning links to pages that do not exist or are otherwise unavailable—can receive lower ranking scores for search engine queries and, as a result, may not be returned as frequently in search results or near the top of the search results when it is returned.

SUMMARY

This document generally describes systems, devices, computer program products, and techniques to allow for providing dynamic client-side fixes to web pages, such as fixes for accessibility issues, search engine optimization, and/or other issues. Such fixes can be implemented without having to modify or otherwise change the underlying website code. For example, a website developer can add an "include" statement (or other reference) for code to be downloaded by a client device and run as part of the website. The code can be customized to fix issues that would otherwise be presented as part of the website on the client device, such as accessibility issues (e.g., font too small, colors without sufficient contrast, menu structure not sufficiently accessible, no alternatives to images, audio, text), search engine optimization issues (e.g., broken links), and/or other client-side website presentation issues. The code can, for example, dynamically search for and modify elements in the DOM tree on the client device. Other types of client-side modifications are also possible.

Client-side modifications can be selected by website developers from a code repository of possible fixes, which can be previewed and approved by the website developer before they are released and published to client devices. For example, a single client-side code fix may not work across all websites and, in some instances, has the potential to dynamically create additional issues on the client-side than were already present. By presenting website developers with options and previews, website developers can control the particular code segments that are distributed to client devices with their website and can also ensure that they will work as intended to dynamically resolve the issues on the client device. Each website can have a corresponding and customized set of code fixes that, in large part, are based on approved selections by website developers through a preview mode. Developers may, in some instances, opt to approve code fixes without a preview.

Code segments to provide dynamic client-side fixes can be automatically generated, for example, through various techniques, such as through machine learning techniques (e.g., neural networks, clustering). For example, websites that exhibit an issue can be contrasted against other websites that do not have the same issue and that potentially have a fix for the issue. Through static and/or dynamic analysis (e.g., analysis of the DOM trees for various websites), code fixes can be automatically generated and added to a repository of code fixes.

In some implementations, a method for remediating issues on webpages through client-side fixes that are performed without modifying underlying webpage code includes receiving, at a remediation server system, a request for remediation code, the request for remediation code originating from a client computing device that has accessed a webpage that has a statement requiring the remediation code, the webpage being part of a website that is hosted by a third party server system, the request identifying the webpage that is requesting the remediation code. The method can further include identifying, from among a plurality of remediations, one or more specific remediations that were previously previewed and approved by an owner of the website for remediating issues on the website; accessing, from a remediation code database, one or more specific remediation code portions that correspond to the one or more specific remediations, the remediation code database including a plurality of different remediation code portions that correspond to the plurality of remediations; and accessing a client-side remediation code engine that is designed to traverse and modify a DOM tree on the client computing device to implement client-side remediations. The method can further include transmitting the client-side remediation code engine and the one or more specific remediation code portions to the client computing device, wherein the client-side remediation code engine is run on the client computing device and causes the one or more specific remediation code portions to modify the DOM tree for the webpage on the client computing device.

Such a method can optionally include one or more of the following additional features. The client-side remediation code engine can identify specific portions of the DOM tree to modify based on DOM tree identifiers that are included in the one or more specific remediation code portions. The DOM tree identifiers can be based on combinations or computations derived from features in the DOM tree. The DOM tree identifiers can include hashes of the features in the DOM tree. The specific portions of the DOM tree can include geometric segments of the webpage and the one or more specific remediation code portions are only applied to the geometric segments. The one or more specific remediations can be identified for the geometric segments and the website in the remediation code database.

Certain implementations may provide one or more advantages. For example, issues for pages (e.g., accessibility issues, SEO issues) on a website can be identified and corrected automatically. Users, such as webmasters of a company's website(s), who have little or no knowledge on the subject of digital accessibility can be provided with tools that automatically identify accessibility issues that exist on pages of their website(s). Accessibility issues can be identified and fixed without committing development resources to make code fixes, as no formal training in coding and remediating for accessibility is required. For example, correcting accessibility issues can meet the needs of K12 and higher education verticals in the United States in which there is an increasing demand from the federal Office of Civil Rights (OCR) to resolve accessibility issues brought on by customer complaints. Accessibility issues can be corrected quickly, meeting any urgent need to react and resolve issues within a tight timeline.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
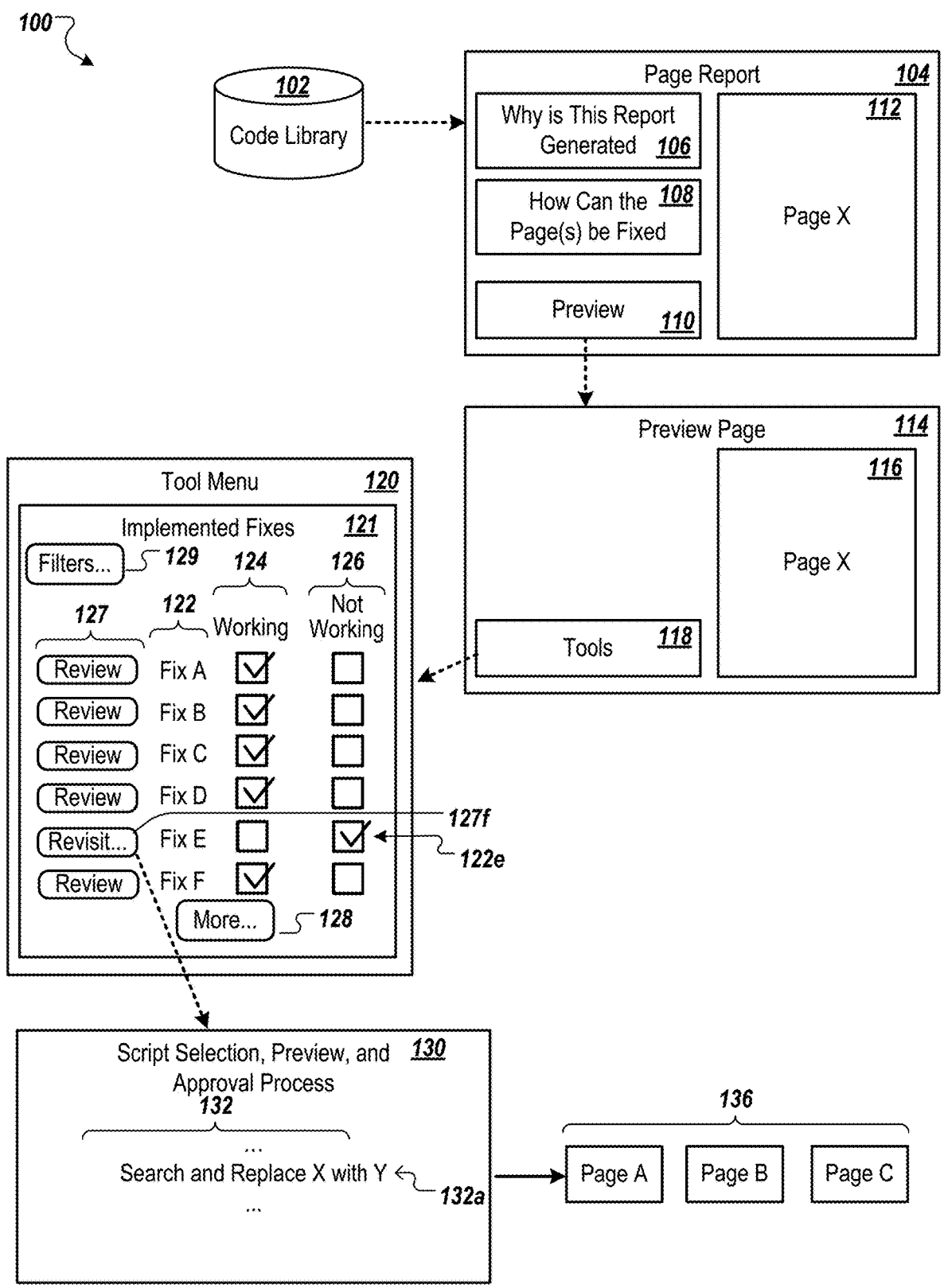
FIG. 1 is block diagram of an example system for completing dynamic content modifications to fix issues on pages of a website.

Techniques described in the present disclosure can be used for remediation purposes for pages of a website, specifically to identify and correct issues on the pages, such as accessibility issues, SEO issues, and/or other issues related to content being presented on a website. The techniques can include, for example, automated solutions and guidance approaches. The automated solutions can include the use of applications built on a code library of fixes, with preview and approval functionalities that allow a user to selectively apply changes. Guidance approaches can include textual and interface updates in the form of easy-to-use, self-serve features that are built directly into a page report. The features can educate a user and allow the user to self-manage accessibility fixes over the long-term.

Remediation tools for identifying and correcting issues for pages of a website can include automated and self-managed aspects. The remediation tools can be beneficial for businesses and organizations, for example, that lack expert skills and resources (e.g., developers and webmasters) to identify and fix issues (e.g., lack expertise in accessibility issues and compliance with Web Content Accessibility Guidelines (WCAG) 2.0 and other standards or requirements for making content more accessible to people with disabilities). In another example, remediation tools can be beneficial for business and organizations that need to retrofit an existing or legacy web environment to include various updates, such as SEO updates, accessibility fixes, and/or others. In a further example, remediation tools can be beneficial for businesses and organizations that have urgent needs to implement various changes and do not have the time or resources to modify the underlying website code. In another example, remediation tools can be beneficial for businesses and organizations that need to bulk-fix minor issues immediately, efficiently, and consistently, without the need to delegate the work to a development team.

Remediation tools can be used to identify problems with specific elements of pages of a website. Identifying the problems can include specifying criteria (e.g., accessibility criteria, SEO criteria) that are not met, as well as identifying specific criteria that are already met by elements on pages of the website. Specific problems can be flagged for presentation to the user, such as by displaying a copy of one of the pages of the website that is noncompliant and highlighting (such as by circling or by using other display mechanisms) specific issues. As an example, a visual link that appears on a page of a website can be flagged, such as by using an image of the page with highlighting or other marking. In some implementations, a detected accessibility issue can include a marking along the lines of, "This link is noncompliant with accessibility standard X because of Y, but a simple fix is available for this and other similar instances."

Various remediation strategies can be used. For instance, in a first example strategy, elements of pages of a website can be analyzed to identify issues, such as accessibility issues, SEO issues, and/or other issues. The analysis can include, for example, accessing a database of known issues and using automated techniques to scan the Hypertext Markup Language (HTML) that is used to generate the pages. In some implementations, the known issues can include: 1) industry-wide issues (that may pertain to the pages of any websites); 2) categories of issues (that may pertain to pages of websites in a same vertical, a same geographic region, or covering a same subject matter); and 5) partner-unique accessibility issues that are known to have been identified (and possibly corrected) for the same user, such as the webmaster who manages pages of websites under the webmaster's control. A second example strategy can include, for example, using a fully-automated process for the identification and correction of issues. Fully-automated processes can include, for example, processes that occur after a user's authorization to automatically make fixes to accessibility issues. The authorization can occur, for example, after the user completes a process of reviewing and approving similar fixes, thus reaching a trusted level that requires no parameters or further input from the user. In a third example strategy, manual adjustments can be used that involve input from the user in a process that requires user review and authorization of individual issues that have been identified.

Automated and semi-automated processes can, for example, be used to identify a node that is to be modified. Modifications can occur by simply making a change in a copy of the DOM tree that represents HTML as a tree structure of tags. The identified node (such as a tag in the DOM tree, or an identifier for the node) can be combined with a hash of a DOM node plus a value of the node to be verified. The resulting hash DOM, modified with color for presentation to the user, can serve as a further identifier. Other techniques, systems, and processes for implementing automated and semi-automated processes are also possible.

Remediation tools can be customized, such as including customization based on characteristics of pages of the website. The customization can further be based on the types of issues (e.g., accessibility, SEO, other issues) that have been fixed in the past as well as characteristics of issues that are currently being considered for being fixed. Customization can apply, for example, to all pages of the website and to categories of elements on those pages. In some implementations, remediation tools can be tailored to (or generated based on) a service agreement for implementing website-specific strategies. For example, the webmaster of a website may have a specific target goal to be reached, such as to correct all accessibility issues that are related to a specific group of individuals with a particular disability. In some implementations, site-specific remediation code can be written and provided to a user for use in fixing accessibility issues.

In some implementations, remediation tools can include the use of images that are presented to the user. For example, the use of various features that are available from a tools menu can result in the presentation of an image. As an example, an image can be presented to the user that shows a current representation of a page from a website, including highlighting one or more accessibility issues that may be present on the page. In some implementations, hovering over a portion of the image that includes a highlighted accessibility issue can trigger the presentation of information that explains why an accessibility issue exists. Other information that can be presented includes a description of a potential fix or steps that can be taken to remediate the situation (and optionally, other instances that are similar). In another example, an image can be presented that shows the results of a fix that has been made based on accessibility issues. In some implementations, the user can be presented with an option to show "before-and-after" images, resulting in a display of a page (or a portion of the page) before and after the accessibility issue has been fixed. In some implementations, after a user makes a fix to pages of one or more websites, a series of images can be presented that show the effects of the fix. Images can also be used to present pages on which fixes are no longer working. In this example, the user can be presented with an accessibility fix that is determined automatically by the system so that the user can page through the pages, view the accessibility issue, and confirm the application of changes along the way.

Automated remediation tools can include the development and management of a code library of fixes for issues (e.g., accessibility issues, SEO issues) that are independent of specific customer websites or environments. The code library can be used within, or in combination with, JAVASCRIPT files. In this way, the code library can be used and/or referenced on all pages without altering original source code. For example, when a page is loaded, the .js file can crawl the page and apply only the necessary fixes on the client side within the instance of any browser.

Automated remediation tools can cover non-visual fixes that address issues of compatibility with assistive technologies. In some implementations, the tools can include a preview mode that includes an option that allows the user to preview a respective fix on the page and in the page's corresponding HTML before approving and applying the fix. In some implementations, the tools can leverage heuristics and machine learning, which can allow the code library to evolve over time to cover more technically complex issues and to allow the replacement of manual tasks with automatic or semi-automatic procedures. For example, if the user has shown a tendency to always manually correct a similar accessibility issue over several pages, then the correction can be incorporated into a set of accessibility fixes that occur automatically.

Remediation tools can be used to leverage expert partnerships. For example, the creation of a code library can include code fixes from partnerships with accessibility consulting firms and other experts in the field. Accessibility partners can add increasingly more complex fixes that can correct inherent issues with CMS templates and layout issues or that can replace manual input procedures with automatic or semi-automatic procedures. Partners who help with the development of the remediation tools can provide consultation (including initial assessment of customer requirements, technical environments, and limitations), build customized manual fixes, and make suggestions for more visual fixes.

In some implementations, automated remediation tools can include the following features. The tools can allow an entity that controls a website, for example, to match the offerings of its website to websites of key competitors, such as to migrate to a similar level of accessibility. The tools can provide a starting point by which customers can adopt accessibility into their practices. For example, the tools can provide a robust code library that is built from automatic and manual fixes. The code library can be updated and applied outside of the user environment.

Guidance approaches for the use of the tools over time can include the following. In addition to the use of automated JAVASCRIPT solutions, long-term strategies can evolve that use both the capabilities of the tool and the ability of individual users to manage remediation tasks over time. As such, with the guidance approaches in mind, a complete service package can be provided that supports customers throughout each step of the digital accessibility process. The tools can provide step-by-step instructions, assign roles, and provide cut-and-paste code examples that are available within a user interface, such as available from page reports. The tools can be designed to provide user control, including providing an emphasis on a model of self-management to educate and empower users to make informed decisions about accessibility fixes, which can reduce the number of issues and their remediation costs (e.g., including internal and external costs).

Benefits of guidance approaches can include the following. Users can be educated, through guidance provided by the remediation tools, to self-manage common fixes. Preview modes can provide users with informed decision making abilities. Code examples can be copied and applied directly into a user environment, immediately showing the effects of a proposed change to the user's website. Accessibility issues can be fixed in the user's source code. The guidance approach can result in fewer issues and higher digital certainty index (DCI) scores. Consulting and development costs can be reduced, e.g., as ease-of-use leads to long-term retention.

Technical considerations associated with automated remediation tools can include the following. In some implementations, when issues are detected using certain types of front-end frameworks that can limit client-side DOM patching, a warning can be displayed to the user. For example, the warning can explain (such as during preview mode) that a particular patch to make accessibility fixes will not work. Further, instructions can be provided the describe how the users can make the fix themselves, or partnership services to customize a patch can be offered. In some implementations, such as with configuration management systems that do not provide easy reversal of automated fixes, cascading style sheet (CSS) selectors can be relied upon for locating DOM nodes that are to be patched. In some implementations, for example, in which several common code fixes require manual input, users can be prompted for additional information (that can be injected into the code) before the patch is allowed to be applied.

FIG. 1 is block diagram of an example system 100 for completing dynamic content modifications to fix issues on pages of a website. The example system 100 is described with regard to fixing accessibility issues as an illustrative example, but it can be used to fix other types of issues as well, such as SEO issues, website updates, language translations issues, compatibility issues, regulatory issues, and/or other issues. For example, the system 100 can be used by a user to fix issues associated with the use, of the pages, by someone with a disability. Users of the system 100 can include owners of a website, webmasters in charge of maintaining pages for one or more websites, and other users who can use the system 100 as a tool for making pages of a website better, more consistent, and more accessible.

In some implementations, some or all of the features of the system 100 can be accessible to web programmers, such as in a plug-in in an integrated development environment (IDE) or other application environment. In some implementations, some or all of the features of the system 100 can be configurable, such as to allow users to specify the types of accessibilities to identify and/or to prioritize particular types of accessibility issues.

A code library 102 can include code, for example, HTML and/or other code that is used for creating documents on the web. A page report screen 104 can be part of a user interface used by users to maintain pages on their website for accessibility. The page report screen 104 can be a screen that is available from a site improvement entity that offers various solutions for web page design, maintenance, and improvement. In some implementations, the page report screen 104 can be provided as a standalone system accessible through the user's personal computer, laptop computer, or other computer. In some implementations, the page report screen 104 can be provided as an application (or "app") that resides on the user's mobile device such as a smart phone.

In some implementations, the page report screen 104 can be automatically displayed to the user if a background process of the site improvement entity detects (such as by crawling pages of the user's website) an accessibility issue within an existing page. In some implementations, the page report screen 104 can be provided automatically, such as shortly after an accessibility issue is introduced into one or more pages of a website. This can occur, for example, if the webmaster or other web developer makes a change that causes the introduction of an accessibility issue (e.g., web page P is no longer compliant with accessibility standard S for users with disability D).

The page report screen 104 can include a "Why" control 106 that summarizes one or more reasons that web pages identified in the report exhibit a particular accessibility issue. For example, selection of the "How" control 106 can result in the presentation of information that describes particular accessibility issues and why the accessibility issues should be fixed.

The page report screen 104 can include a "How" control 108 that summarizes one or more actions that can be taken to resolve the problems to fix pages of a website and eliminate the particular accessibility issues. For example, selection of the "How" control 106 can result in the presentation of information that describes specific ways to fix particular accessibility issues, including estimates of the time involved to make the fixes. An example can be along the lines of, "the problem can be fixed using a search-and-replace on Tag X and changing each instance to Tag Y across all 14 web pages on which the issue was identified."

A preview control 110 can provide access to a preview page 114 on which one or more pages of a website can be displayed. A display area 112 can be used to display a page, such as a landing page of a website under control of the user.

The preview page 114 can include a page display area 116, on which a page from a website is displayed. The preview page 114 can also include a tools control 118 that is selectable, by the user, to cause presentation of a tools menu 120.

The tools menu 120 can include various tools for maintaining accessibility of web pages. For example, the tools menu 120 can include an implemented fixes area 121 that provides a list of fixes that have been made in the past. The fixes area 121 can include, for each fix of a list of fixes 122, check boxes that are checked for applicable ones of fixes that are still working 124 and fixes that are not (e.g., no longer) working 126 on web pages of a current website. Working/not working information can be identified and presented for fixes that were made at one time and that, for whatever reason, may have stopped working.

Controls 127 can allow the user to perform various actions associated with particular fixes 122. For example, if a particular fix 122e is not working, then the user can select a control 127f that can serve as a link to a script selection, preview, and approval process 130. In this way, the user can revisit a set of fixes (and corresponding process steps) that were used to fix the issue. Further, if a different solution is needed to fix the issue, the user can be provided with options to find and execute a script that will work to fix the issue. Example steps in the script selection, preview, and approval process 130 can include an action such as "Search and Replace X with Y" 132a, among other steps/actions 132 in the process. Other controls 127 can be used as actionable links for presenting screens that display pages of a website to which a particular fix is being applied, such as to provide for presentation display pages 136 on which the particular fix 122f has been applied.

In some implementations, one or more components of the tools menu 120 can include controls 129 for filtering or identifying past and/or ongoing fixes. For example, controls can be used to cause the presentation of information (e.g., working and non-working fixes A-F) for only a subset of particular fixes, such as accessibility fixes that have been made for user users who have disabilities related to vision. Other controls can be used to narrow the presentation to information for selected time periods, selected groups of pages (e.g., under a common main page of a website), or for categories of fixes (e.g., tags related to color or font size).

Figure 2:
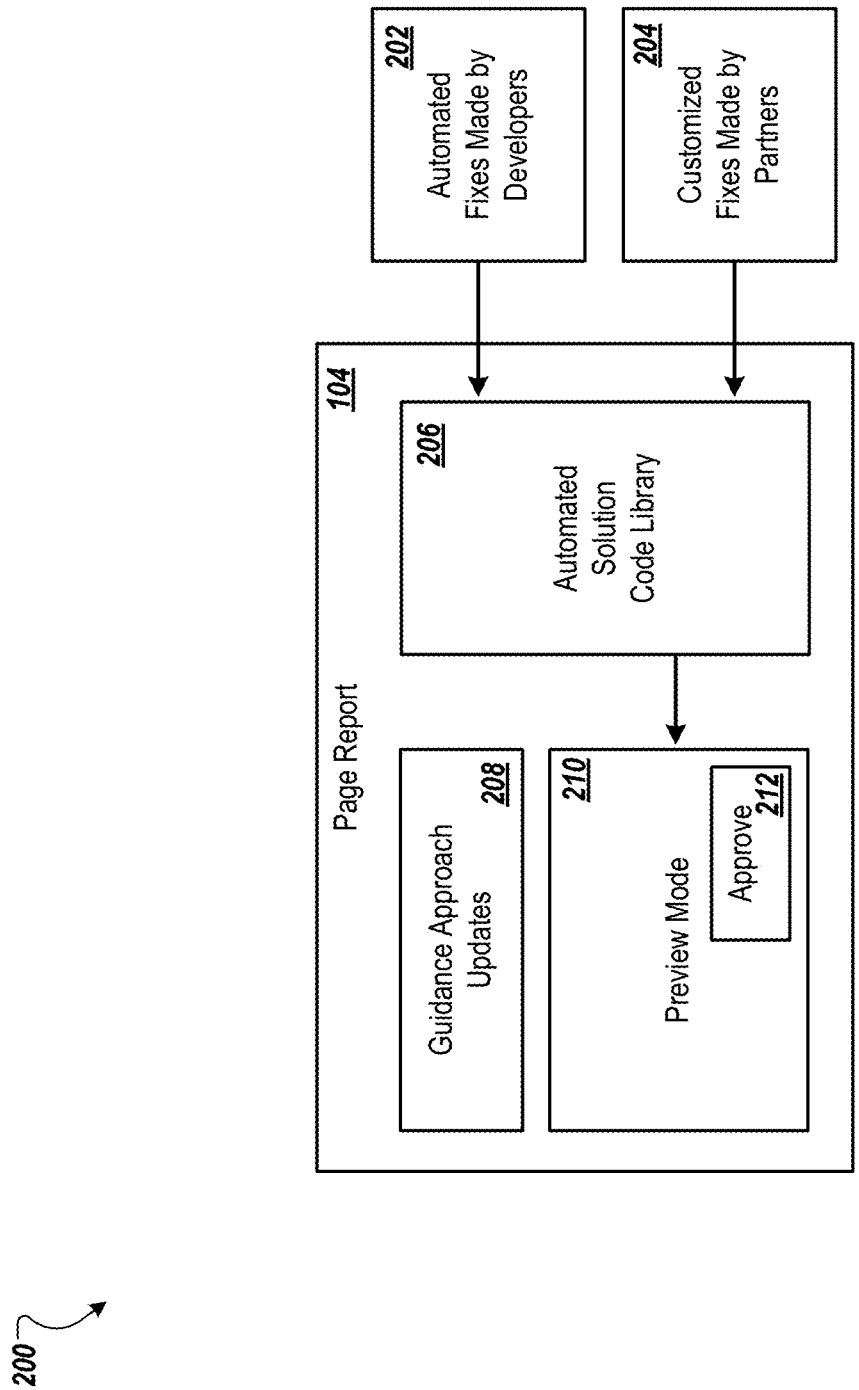
FIG. 2 is a block diagram showing an example of a combined system combining a guidance approach and an automated solution.

FIG. 2 is a block diagram showing an example of a combined system 200 combining a guidance approach and an automated solution. For example, the combined system 200 can be used in conjunction with the system 100. Automated fixes made by developers 202, such as code fixes made using the code library 102, can be used to update an automated solution code library 206. Further, customized fixes made by partners 204, such as code fixes made by users who are webmasters, can also be used to update the automated solution code library 206. The updated solution code library 206 can support a preview mode 210 by which a user can review, for example, accessibility fixes that have been made to a copy of existing source code. The user can select an approve control 212 (e.g., a component of the script selection, preview, and approval process 130) to implement the changes. An approval process can also apply to guidance approach updates 208.

FIGS. 3A-D depict a sequence of user interfaces that are presented on a website owner/developer client device 300 and website user client devices 302 to provide client-side website remediation. The client devices 300 and 302 can be any of a variety of client computing devices, such as mobile computing devices (e.g., smartphones, tablets, wearable devices), desktop computers, laptop computers, and/or other appropriate computing devices.

Figure 3A:
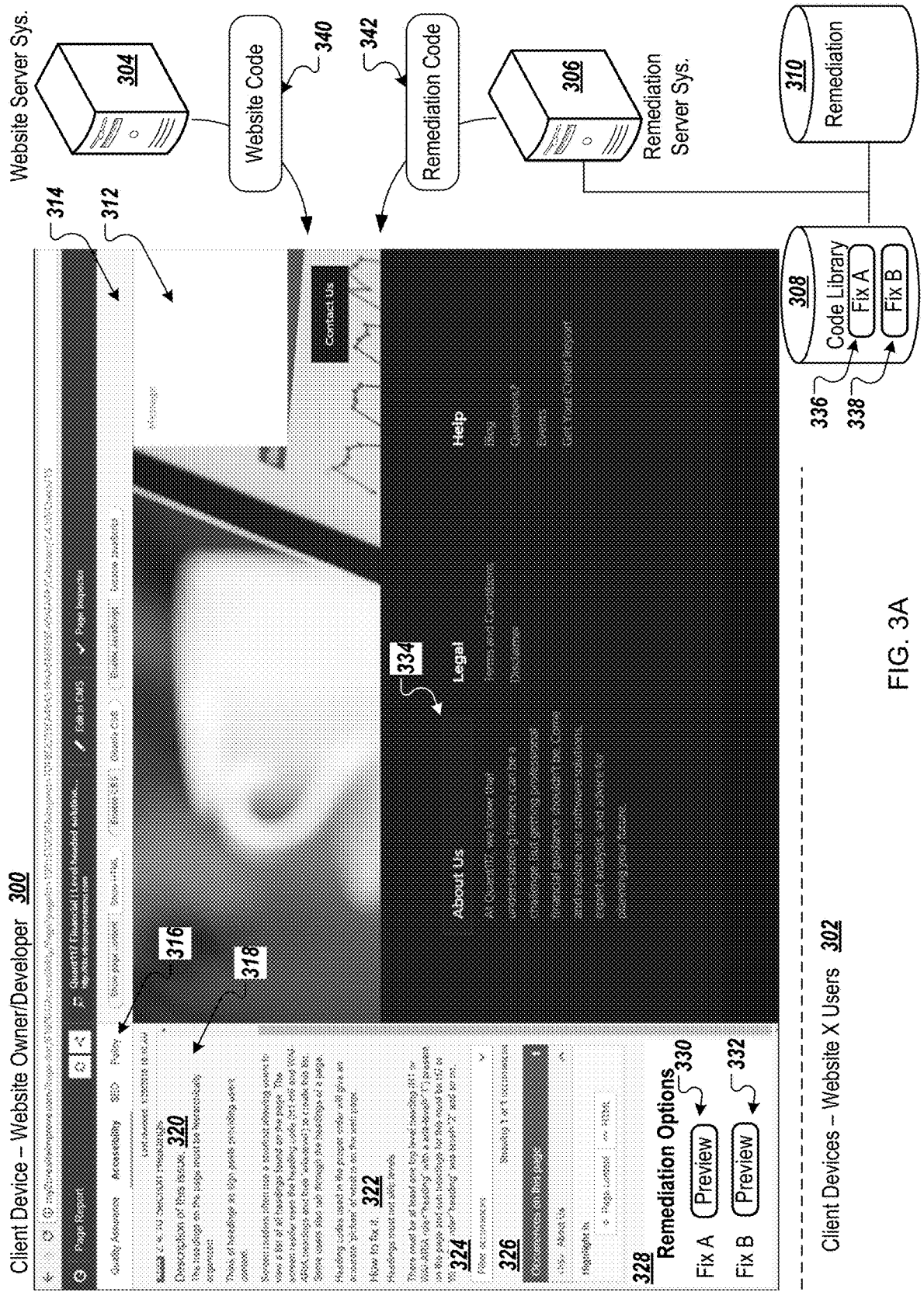
FIGS. 3A-D depict a sequence of user interfaces that are presented on a website owner/developer client device and website user client devices to provide client-side website remediation.

Referring to FIG. 3A, the user interface that is presented on the client device 300 associated with the website owner/developer includes a variety of options for the website owner/developer to identify things to be fixed, to preview client-side fixes, and the push out those fixes to users of the website (e.g., the client devices 302). As depicted, the website owner/developer 300 requests a website code 340 for the website from the website server system 304. The website code 340, when interpreted on the client device 300 (e.g., interpreted by a web browser), can request remediation code 342 from a remediation server system 306. For example, the website code 340 can have an include statement to request and run the remediation code 342 (e.g., one or more scripts, such as JavaScript) as part of presenting the website on the client device 300. The remediation code 342 can include features described above to analyze the website as it is presented/rendered on the client device 300 (e.g., searching and analyzing the DOM tree for the website as created on the client device 300), and code to present user interface features for the website owner/developer to identify and fix issues identified in the website for remediation.

The client device 300 can receive the website code 340 and the remediation code 342, and can run/interpret both of them to present the user interface that is shown in FIG. 3A. The user interface includes a webpage 312 as well as several additional user interface features specifically presented for the website owner/developer, such as the tool bar 314 to toggle between different presentation features (e.g., enable/disable CSS, enable/disable JavaScript) and a remediation side panel 318 to view different issues identified on the webpage 312. The remediation side panel 318 includes a variety of different remediation categories 316, including quality assurance, accessibility, search engine optimization (SEO), website policies, and/or others. In the depicted example, the accessibility option is selected and accessibility issues on the webpage 312 for remediation are described in the side panel 318. In this example, the side panel 318 includes a description of the identified accessibility issues (320), a description of how those issues can be fixed through server-side changes to the website code 340 (322), a drop down menu 324 to filter the number of occurrences of those issues along one or more features, details 326 for each occurrence of the issue on the webpage 312, and client-side remediation options 328 for fixing the issue, which in this example include two different options (Fix A and Fix B). Both of those example fixes are stored in a code library 308 as fixes 336-338. The issue on the webpage 312 is highlighted 334. The remediation options 328 can each be previewed by selecting a corresponding preview button 330-332, which will cause the corresponding code fix from the code library 308 to be transmitted to the client device 300 and run with the website code 340 so that it can be previewed before being pushed out live to the user devices 302.

Figure 3B:
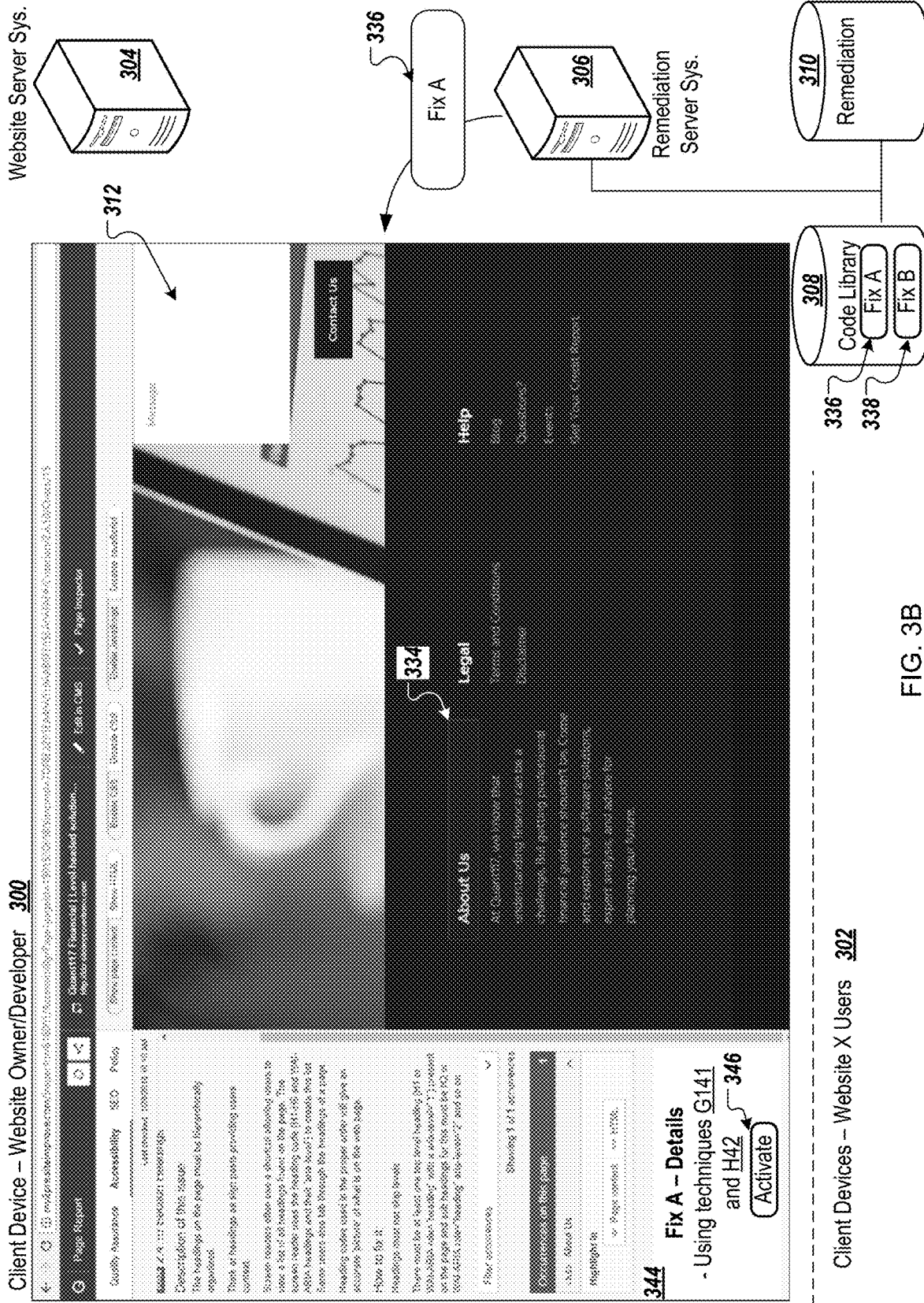

Referring to FIG. 3B, the user interface is presented after the button 330 for previewing Fix A is selected and the code 336 for Fix A is transmitted to and run on the client device 300 so as to preview the fix. In this example, the details about the fix are presented in the area 344, which includes a description of the client-side remediation that is being performed along with a selectable option 346 to activate the feature across all user devices 302 for the website.

Figure 3C:
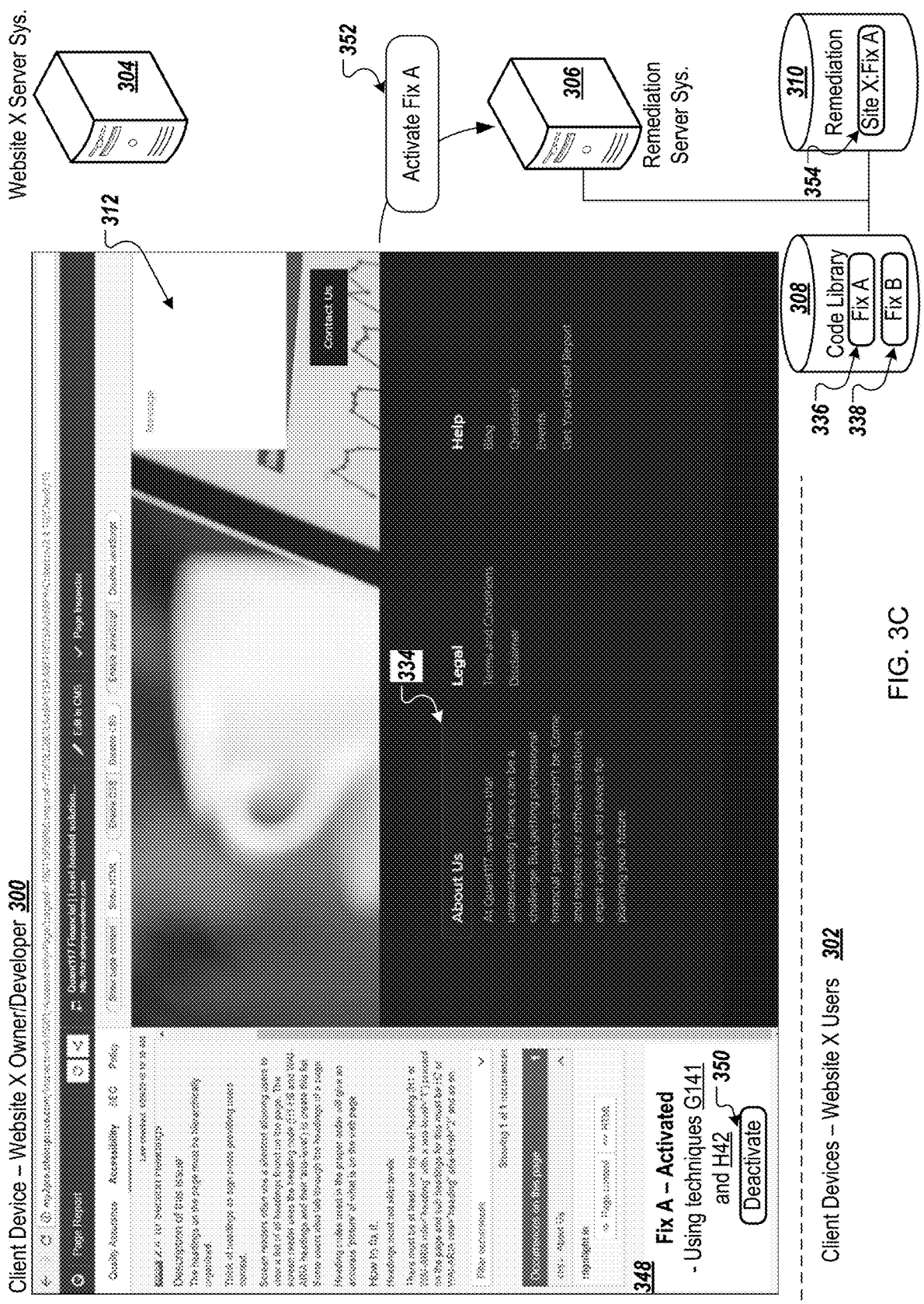

Referring to FIG. 3C, the user interface is presented after the button 346 is selected to activate the Fix A across the website, which involves the client device 300 transmitting instructions 352 to the remediation server system 306 to activate Fix A. In response to receiving those instructions, the remediation server system 306 can store a site specific remediation for the fix. For instance, in this example the website that is being evaluated is website X, and the site specific remediation can be stored in the form of information that identifies the remediation that has been approved (Fix A) in association with the website (web site X).

Figure 3D:
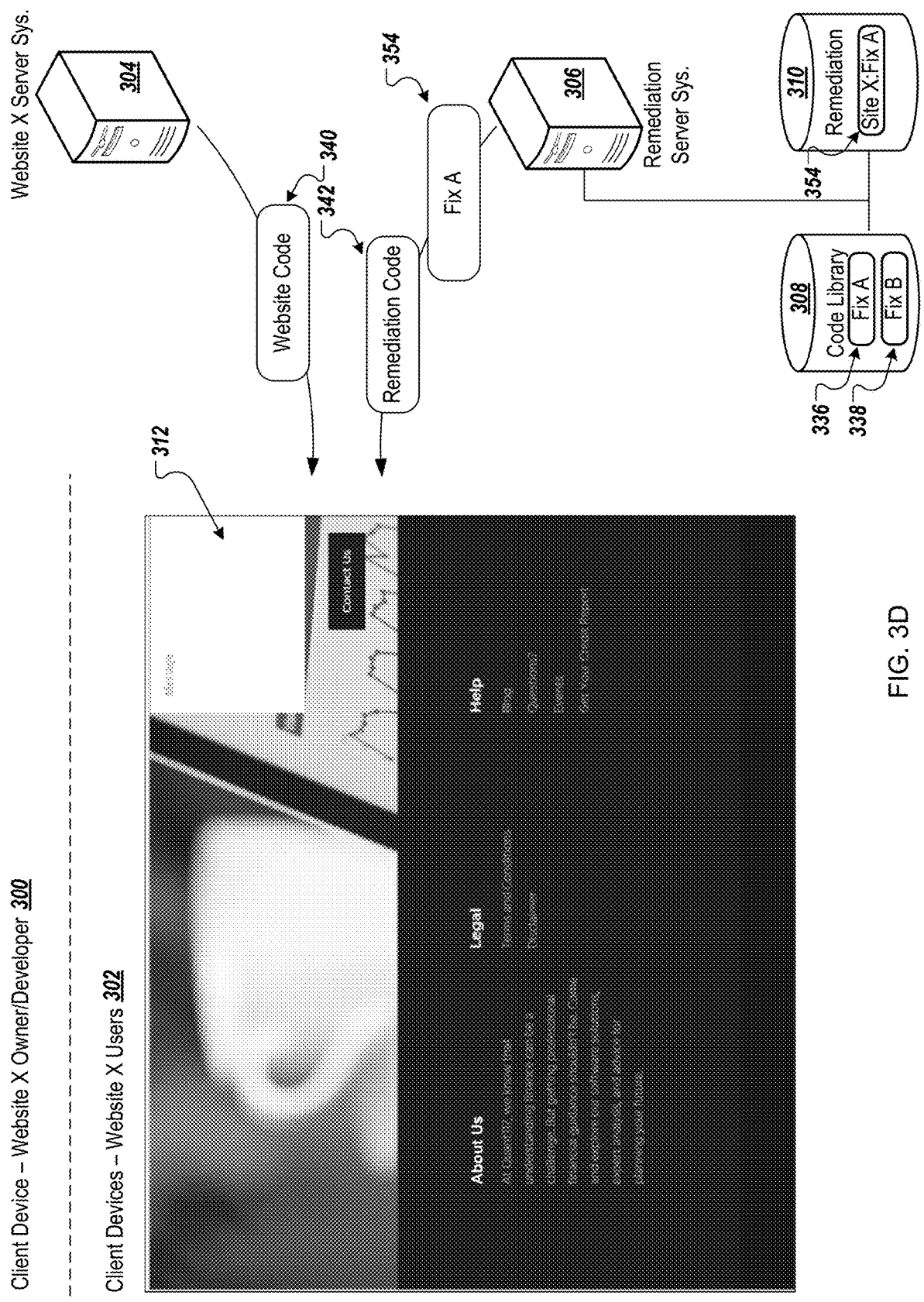

Referring to FIG. 3D, with the remediation Fix A approved for the website X, the remediation is then pushed out live for client-side implementation to the website X users and their client devices 302. For example, the client devices 302 can request the website code 340 from the website server system 304, which can then prompt the client devices 302 to request the remediation code 342 which can be provided with site-specific approved fixes for the website X (provided with the code 354 for the Fix A). These can be run on the client devices 302 to remediate the issues identified on the website 312 without having to perform specific updates to the underlying website code 340.

Figure 4:
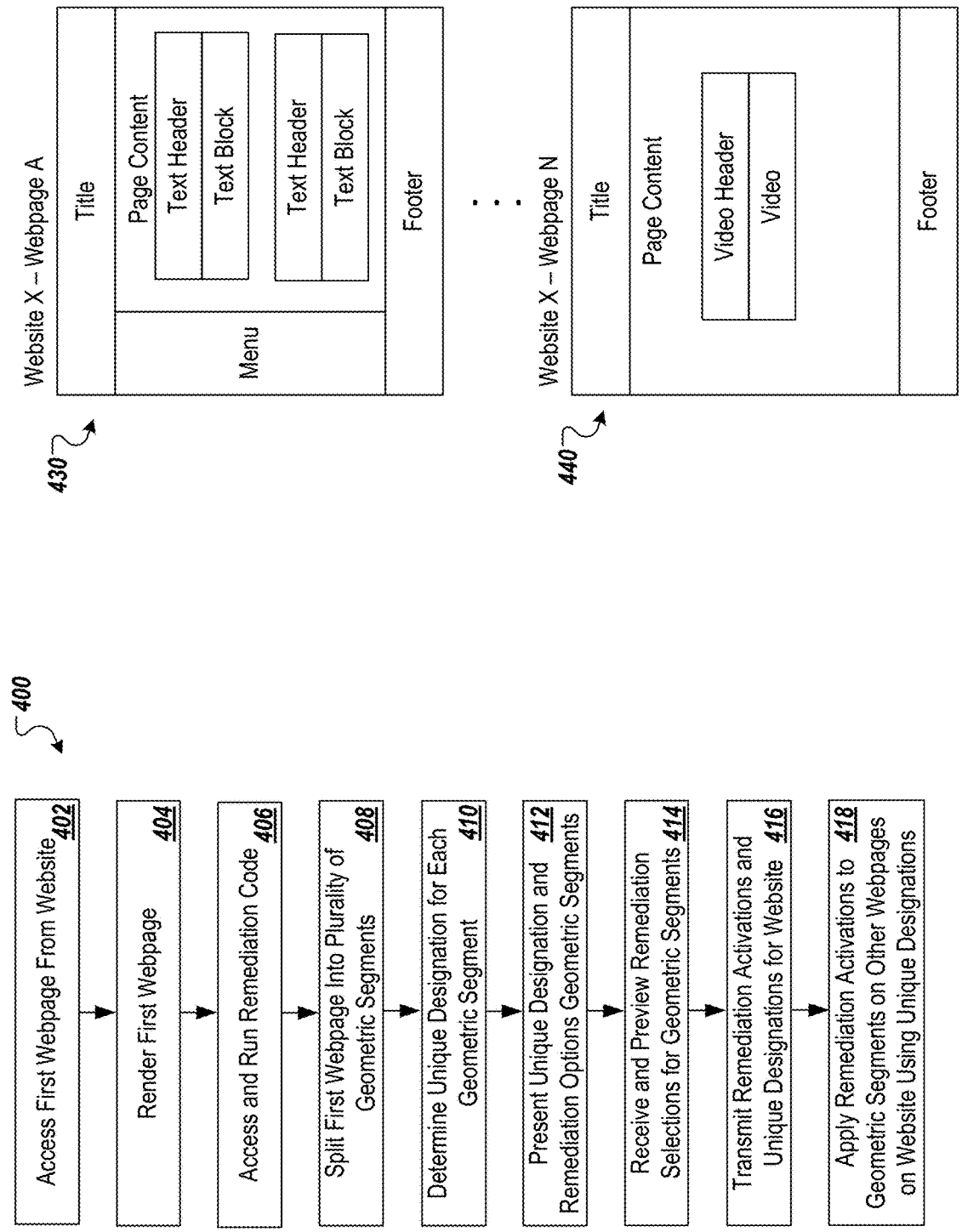
FIG. 4 is a flowchart of an example technique for identifying geometric segments in a webpage and using those geometric segments to implement segment-specific remediation within a website with a greater level of granularity.

FIG. 4 is a flowchart of an example technique 400 for identifying geometric segments in a webpage and using those geometric segments to implement segment-specific remediation within a website with a greater level of granularity. The example technique 400 can be implemented by any of a variety of systems and devices, such as the systems and devices described above with regard to FIGS. 1-3.

Two example webpages A and N (430 and 440, respectively) are depicted in FIG. 4 with high-level geometric segments, which can include bounded and contiguous geometric areas within a webpage that correspond to groupings of content and/or website features. For example, webpage A 430 includes a title segment, a menu segment, a footer segment, and a page content segment that, itself, includes sub-segments of text headers and corresponding text segments. The webpage N 440 includes a similar title segment, footer segment, and page content segment, but includes a sub-segment of a video header and video segment, as well as no menu segment. Identifying segments within the webpages A and N (430 and 440) can be performed, for example, by remediation code and can be used to isolate/implement code fixes for specific segments. For example, a fix for the title segment of webpage A may only be applicable to that segment of the webpage, and may not be applicable globally to all portions of webpage A. Similarly, a fix to the title segment of webpage A 430 may be applicable to other title segments in other webpages for the website, such as to the title segment of webpage N 440. By identifying segments of the webpages of the website, a greater level of granularity can be used to apply fixes (including different types of fixes for different segments that each the same problem) to a website, which can improve the effectiveness and adaptability of client-side remediation.

The technique 400 can be used to implement segment-based remediation. A first webpage from a website can be accessed (402). For example, the webpage A 430 from the website X can be accessed (e.g., download the webpage A 430 code from the web server for website X). The first webpage can be rendered (404). For example, a browser or other application can interpret and render the webpage A 430, which can include constructing a DOM tree for the webpage A 430 that is used to locate and display the webpage A 430. Remediation code can be accessed and run (406). For example, the remediation code can be a script that is identified via an include statement on the webpage A code, and can be retrieved from a remediation server system (e.g., remediation server system 306) and run. The remediation code can split the first webpage into a plurality of different geometric segments (408). For example, the remediation code can access the DOM tree for the webpage A 430 and, based on the hierarchy and composition of the nodes in the DOM tree, including the location and positioning of various graphical components as part of the webpage A 430, can split the webpage A 430 into multiple different segments. The segments can be defined at varying levels of granularity, including having segments that are nested within each other. Example segments are depicted for the webpage A 430.

Unique designations for each of the geometric segments can be determined (410). For example, unique identifying features for each of the segments from the webpage A 430 can be generated, such as a combination of the features in the segment (e.g., combination of content elements, combination of style features), the absolute positioning and location of the segments as they are presented in the user interface (e.g., segment appears in the top third of the user interface, segment appears on the left/right side of the user interface), the relative positioning and location of the segments (e.g., title segment positioned above page content section), and/or hashes and/or other computed values from one or more of the above features (e.g., hash of one or more values in the root DOM node for the segment).

The unique designations and remediation options for the geometric segments can be presented (412). For example, the different segments of the webpage A 430 can be annotated on the webpage, similar to the annotation 334 of the issue identified in the user interface 312. Additionally, options to fix issues occurring within each of the segments can also be presented, similar to the remediation options 328 depicted in FIG. 3A. Selections of remediation options can be received and previewed in the user interface (414). For example, similar to the preview of remediation options in FIG. 3B, segment-based remediation options can be selected and previewed in the user interface. Remediation activations can be received and transmitted with their corresponding unique segment designations for the website (416). For example, as described above with regard to FIG. 3C, once a segment-based remediation has been activated, instructions designating that activation can be transmitted to the remediation server system along with the unique designation for the corresponding segment to which the remediation applies. That information—the website identifier, the website segment designation, and the specific remediation—can be stored in the remediation database 310 for service to user client devices 302.

The remediation activations can then be applied to other webpages for the website with geometric segments that have the same unique designation (418). For example, the user may approve a remediation for the title segment in the webpage A 430, with the intention that the remediation should apply to all title segments in the website X, such as to the title segment in the webpage N 440. The remediation designation can be applied globally to other pages that are part of the website, but the remediation can be isolated to being applied to the applicable segment(s) that have been designated by the user.

Although FIG. 4 and the technique 400 is described and depicted with regard to remediation, it can be used, applied, and adapted in a variety of different ways. For example, remediations can be considered more generally to be improvements to a website, such as SEOs that can be implemented on a website to improve its ranking in search engines for various queries. For example, an variation of the technique 400 can include rendering the first webpage (404), applying a code portion to the first webpage to analyze the webpage as rendered (406), splitting the page into a plurality of segments (408), determining a unique designation for each of the segments (410), and then using those designations to identify and perform SEO on the first webpage and other webpages for the website. For instance, search engines can value the positioning of various content items across different segments of a webpage when determining webpage rankings (e.g., keyword in title can have greater weight in ranking than in footer). Such a technique can identify these different segments and can be used to better enhance and improve SEO for a website. Other implementations and/or variations of FIG. 4 and the technique 400 are also possible.

Figure 5:
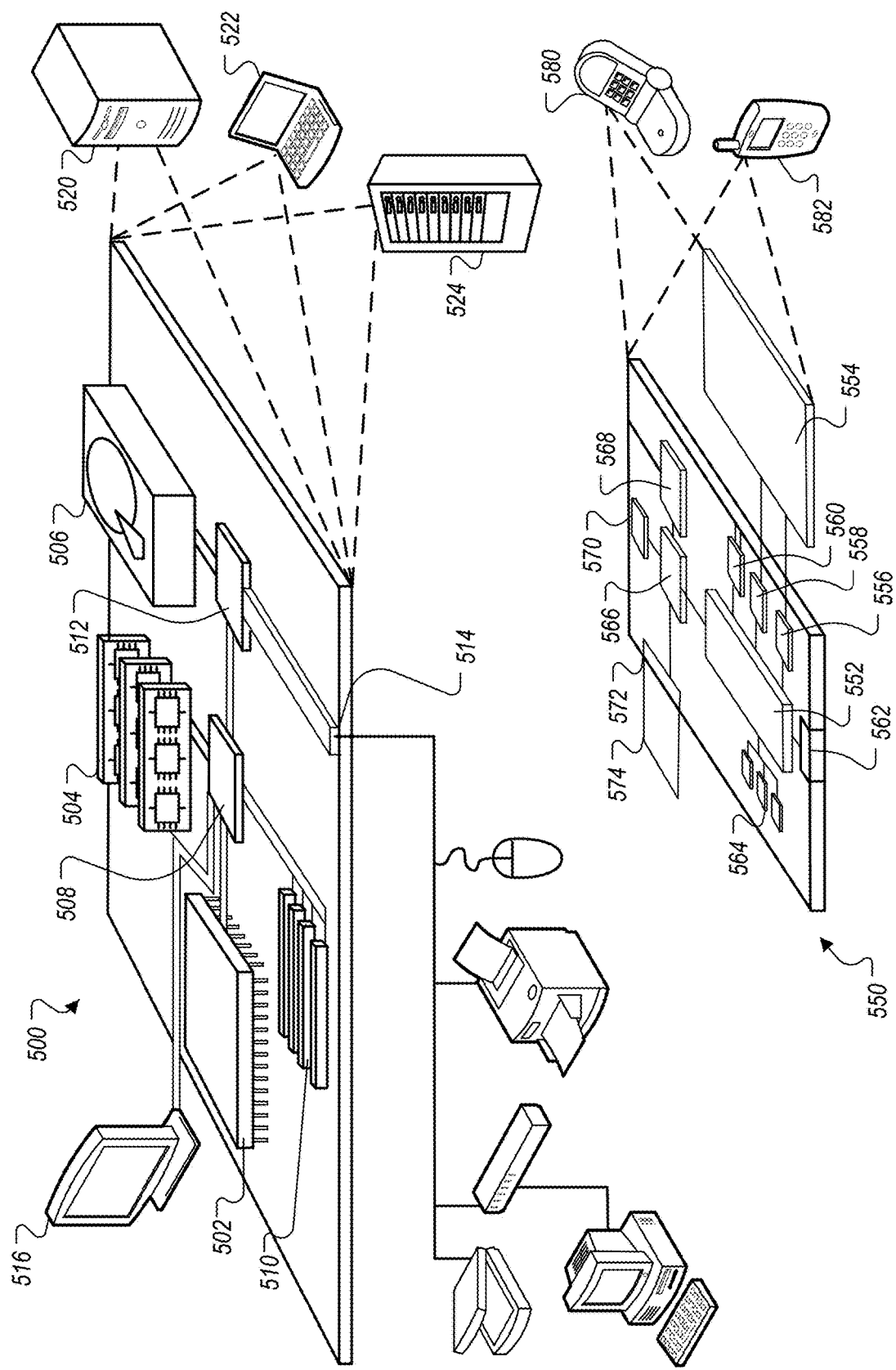
FIG. 5 is a block diagram of example computing devices that may be used to implement the systems and methods described in this document, as either a client or as a server or plurality of servers.

FIG. 5 is a block diagram of example computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 500 is further intended to represent any other typically non-mobile devices, such as televisions or other electronic devices with one or more processers embedded therein or attached thereto. Computing device 550 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 500 includes a processor 502, memory 504, a storage device 506, a high-speed controller 508 connecting to memory 504 and high-speed expansion ports 510, and a low-speed controller 512 connecting to low-speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low-speed controller 512 manages lower bandwidth-intensive operations. Such allocation of duties is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed bus 514. The low-speed bus 514 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms and/or virtualized, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The computing device 550 may also be provided with a storage device, such as a micro-drive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the computing device 550, such as control of user interfaces, applications run by computing device 550, and wireless communication by computing device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of computing device 550 with other devices. External interface 562 may provide, for example, for wired communication (e.g., via a docking procedure) or for wireless communication (e.g., via Bluetooth® or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to computing device 550 through expansion interface 572, which may include, for example, a subscriber identification module (SIM) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provided as a security module for computing device 550, and may be programmed with instructions that permit secure use of computing device 550. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 568 (e.g., a radio-frequency transceiver). In addition, short-range communication may occur, such as using a Bluetooth®, WiFi, or other such transceiver (not shown). In addition, GPS receiver module 570 may provide additional wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

The computing device 550 may be implemented in a number of different forms, as shown in the figure. For example, it may be implemented as a cellular telephone 1080. It may also be implemented as part of a smartphone 582, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for remediating issues on webpages through client-side fixes that are performed without modifying underlying webpage code, the method comprising:
   receiving, at a remediation server system, a request for remediation code, the request for remediation code originating from a client computing device that has accessed a webpage that has a statement requiring the remediation code, the webpage being part of a website that is hosted by a third party server system, the request identifying the webpage that is requesting the remediation code;
   identifying, from among a plurality of remediations, one or more specific remediations that were previously previewed and approved by an owner of the website for remediating issues on the website;
   accessing, from a remediation code database, one or more specific remediation code portions that correspond to the one or more specific remediations, the remediation code database including a plurality of different remediation code portions that correspond to the plurality of remediations;
   accessing a client-side remediation code engine that is designed to traverse and modify a DOM tree on the client computing device to implement client-side remediations; and
   transmitting the client-side remediation code engine and the one or more specific remediation code portions to the client computing device, wherein the client-side remediation code engine is run on the client computing device and causes the one or more specific remediation code portions to modify the DOM tree for the webpage on the client computing device.

2. The method of claim 1, wherein the client-side remediation code engine identifies specific portions of the DOM tree to modify based on DOM tree identifiers that are included in the one or more specific remediation code portions.

3. The method of claim 2, wherein the DOM tree identifiers are based on combinations or computations derived from features in the DOM tree.

4. The method of claim 3, wherein the DOM tree identifiers comprise hashes of the features in the DOM tree.

5. The method of claim 4, wherein the specific portions of the DOM tree comprise geometric segments of the webpage and the one or more specific remediation code portions are only applied to the geometric segments.

6. The method of claim 5, wherein the one or more specific remediations are identified for the geometric segments and the website in the remediation code database.

\* \* \* \* \*